United States Patent [19]

Keyes et al.

[11] Patent Number: 6,118,906
[45] Date of Patent: Sep. 12, 2000

[54] SHARPENING SYSTEM ADJUSTED FOR MEASURED NOISE OF PHOTOFINISHING IMAGES

[75] Inventors: Michael P. Keyes; Karen A. Hoff, both of Fairport, N.Y.

[73] Assignee: Eastman Kodak Company, Rochester, N.Y.

[21] Appl. No.: 09/018,098

[22] Filed: Feb. 3, 1998

[51] Int. Cl.$^7$ .................................................. G06K 9/40
[52] U.S. Cl. ........................................... 382/266; 382/199
[58] Field of Search ........................... 382/199, 266–269, 382/261–265

[56] References Cited

U.S. PATENT DOCUMENTS

| | | | |
|---|---|---|---|
| 4,571,635 | 2/1986 | Mahmoodi et al. | 358/284 |
| 4,783,840 | 11/1988 | Song | 382/54 |
| 4,991,092 | 2/1991 | Greensite | 364/413.22 |
| 5,038,388 | 8/1991 | Song | 382/54 |
| 5,051,842 | 9/1991 | Shimazaki | 358/447 |
| 5,081,692 | 1/1992 | Kwon et al. | 382/54 |
| 5,390,264 | 2/1995 | Ishihara et al. | 382/54 |

OTHER PUBLICATIONS

"Print Grain Index—An Assessment of Print Graininess from Color Negative Films," Kodak Publication No. E–58, Catalog #8875809, 1994.

J.J. DePalma et al., "Sine Wave Response of the Visual System. II. Sine–Wave and Square–Wave Contrast Sensitivity," Journal of the Optical Society of America, vol. 52, No. 3, Mar. 1962, pp. 328–335.

G.M. Einhaus, "Granularity and Graininess Metrics for Color Negative Films," SPSE 43rd Annual Conference Proceedings, Springfield, Virginia, 1990, pp. 209–210.

T.O. Maier et al., "The Relationship Between Graininess and Granularity," SPSE 43rd Annual Conference Proceedings, Springfield, Virginia, 1990, pp. 207–208.

C.J. Bartleson, "Predicting Graininess from Granularity," The Journal of Photographic Science, vol. 33, 1985, pp. 117–126.

*Primary Examiner*—Thomas D. Lee
*Assistant Examiner*—Stephen Brinich
*Attorney, Agent, or Firm*—William F. Noval

[57] ABSTRACT

A method of processing a digital image comprising the steps of: providing a pixellated digital image having noise components; measuring the noise components in the digital image with a noise estimation system to generate noise estimates; and sharpening the digital image with an image sharpening system which uses the noise estimates.

16 Claims, 4 Drawing Sheets

SHARPENING SYSTEM ADJUSTED FOR MEASURED NOISE OF PHOTOFINISHING IMAGES

FIELD OF THE INVENTION

This invention relates in general to digital imaging systems and relates more particularly to a digital photofinishing system having a sharpening system adjusted for measured noise of photofinishing images.

BACKGROUND OF THE INVENTION

A digital photofinishing system includes a film scanner, an image data manager (IDM), and a printer to make photographic prints. The system is designed to scan photographic color negative and reversal camera films, apply a set of image processing steps to those images in the IDM, and print them to photographic paper.

Specifically, the system is designed for high volume photofinishing which is commonly used to produce prints for non-professional consumer customers. These systems are commonly used in wholesale and miniilab applications, where high productivity, measured by the number of images processed in a specific period of time, is very important.

Random signal variations in a digital image are known as "noise." Excessive levels of noise are objectionable to customers. One major source of noise is the granularity of the film that is scanned. Film granularity increases with film speed, i.e., from ISO 100 to 800 speed, and increases with smaller format, e.g., from 35 mm to the Advanced Photo System (APS). The granularity of films generally increases with the degree of under-exposure.

Another major source for noise in digital images, is from the film scanner, which varies with many factors including the clocking speed of the charged coupled device (CCD) and the analog-to-digital (A/D) converter. Scanner noise increases with the clocking speed.

A specific problem arises with certain image processing steps that enhance the appearance of noise in the images. Specifically, sharpening can enhance the noise to an objectionable level. This is of particular concern for high speed films, like ISO 800 speed, for smaller format films, like APS, and for all under-exposed film images.

At the sharpening step, an unsharp mask is applied to the image. The general equation for the unsharp mask is $D_{sharp} = D_{orig} + K*(D_{orig} - D_{blurred})$ where $D_{sharp}$ is the sharpened image, $D_{orig}$ is the original image, $D_{blurred}$ is a blurred version of the image, and K is a scalar constant.

FIGS. 1–3 conceptually demonstrate the trade-offs between random variations on density, referred to as noise, and sharpening levels. Plots are shown of 30 representative pixels of a flat field area of a digital image. The y-axis represents the deviation of each pixel code value from a density code value average for the flat field. The units of the code value deviations are arbitrary, and the density code value average is simply specified as zero.

The dash/dot lines, called the "objection limit," represent a threshold beyond which the density variations become objectionable to someone viewing the images. The objection limit in FIGS. 1–3 is arbitrary because it varies considerably depending on many factors, including the inherent modulation transfer functions for the printer and the photographic paper. Also, the size of the output images and the viewing conditions, such as the illuminant, are factors that affect the objection limit. The objection limit can be a function of absolute density variations, a standard deviation of density variations, or some other statistical measurement.

FIG. 1 is the plot of 30 representative pixels of a flat field area of a digital image with no sharpening applied. All the density code value variations are well within the objection limit. The density code value variations will be mostly dependent on the inherent granularity of the camera film.

FIG. 2 is a plot of the same 30 pixels with a certain arbitrary level of sharpening applied. The exact level of sharpening depends on the blurring filter and the constant, K, from the unsharp masking equation. All the density code value variations have increased, due to the sharpening process, to a level where some of the variations approach the objection limit.

The sharpening demonstrated in FIG. 2 represents an acceptable level, based on the level of noise, to someone viewing the final image.

FIG. 3 is a plot of the same 30 pixels with a higher arbitrary level of sharpening applied. This situation represents where the constant, K, from the unsharp mask equation is higher than for the situation depicted in FIG. 2. All the density code value variations have increased, due to the sharpening process, to a level where some of the variations are beyond the objection limit.

The sharpening demonstrated in FIG. 3 represents an unacceptable level, based on the excessive level of noise, to someone viewing the final image.

Adjusting the value, K, in the unsharp mask equation is the most common way to control the amount of sharpening in an image. In the following three examples, the sharpening level is varied by adjusting the value, K, pixel-by-pixel based on a calculated estimate of the noise in the immediate region around each pixel. The noise calculation is performed on a neighborhood of pixels surrounding the pixel to be modified.

Mahmoodi and Nelson (U.S. Pat. No. 4,571,635) describe a method for adjusting the value, K, based on the calculated standard deviation of pixel values in the neighborhood immediately surrounding the pixel to be modified. The value, K, varies pixel-by-pixel.

Kwon and Liang (U.S. Pat. No. 5,081,692) describe a method for varying the sharpening by calculating the value, K, with a "centered weighted variance process." The value, K, varies pixel-by-pixel. This process estimates the noise in the neighborhood surrounding the pixel to be modified by weighting each of the neighborhood pixels depending on their location within the neighborhood.

Ishihara, Yamashita, and Fukushima (U.S. Pat. No. 5,390,264) describe a method where the value, K, is a function of the difference in values between the pixel to be modified and selected pixels in the surrounding neighborhood.

While varying the sharpening level pixel-by-pixel may be desirable, the methods which use this approach are demanding relative to the computing time required. This is counter to the need in consumer photofinishing applications for high productivity, which is measured by the number of images processed in a specific period of time.

Also, while methods which vary the sharpening level pixel-by-pixel are frequently appropriate for images for professional customers, they provide image quality benefits which are neither desired nor appreciated by non-professional consumers.

In addition, other methods have been proposed for adjusting the sharpening level of an image.

Shimazaki (U.S. Pat. No. 5,051,842) describes an apparatus which generates unsharp signals from images, derives two parameters based on either the image signal level or the unsharp signal level from a pre-determined lookup table, multiplies one parameter with the image signal, multiplies the other parameter with the unsharp signal, and adds the two resulting signals to obtain the final image signal. One embodiment requires that the sum of the two parameters equal one for all image signal levels. In this case, the method is mathematically equivalent to the unsharp mask equation.

Shimazaki teaches that the two parameters are signal dependent with the signals representing image highlights resulting in the highest degree of sharpening. The two parameters are chosen such that the sharpening decreases as either the image signal or the unsharp signal decreases until the sharpening level is zero. At that point, the sharpening converts to blurring as the image signal or unsharp signal continue to decrease into the shadow region of the density range. Shimazaki's apparatus suffers from not accounting for different film speeds, film formats, and exposure levels.

Greensite (U.S. Pat. No. 4,991,092) describes an imaging technique for enhancing the contrast of medical images which is dependent on measured noise. The noise is measured on a flat field part of the image and the results are used to modify the contrast enhancement. The technique is very restrictive because each image requires the presence of a suitable flat field area.

SUMMARY OF THE INVENTION

According to the present invention, there is provided a solution to optimally sharpen images without an objectionable increase in noise.

According to a feature of the present invention, there is provided a method of processing a digital image comprising the steps of: providing a pixellated digital image having noise components; measuring the noise components in the digital image with a noise estimation system to generate noise estimates; and sharpening the digital image with an image sharpening system which uses the noise estimates.

ADVANTAGEOUS EFFECT OF THE INVENTION

The invention has the following advantages.

1. The noise which is present in an image is estimated regardless of the sources (e.g., film speed, exposure level, scanner A/D converters, etc.).

2. One sharpening level is applied globally to the entire image to sharpen it. This avoids disadvantageous pixel by pixel sharpening which requires excessive computing time which would be detrimental to high speed photofinishing needs.

3. The sharpening method is ideally suited to a high speed digital photofinishing system.

DETAILED DESCRIPTION OF THE INVENTION

Figure 1:
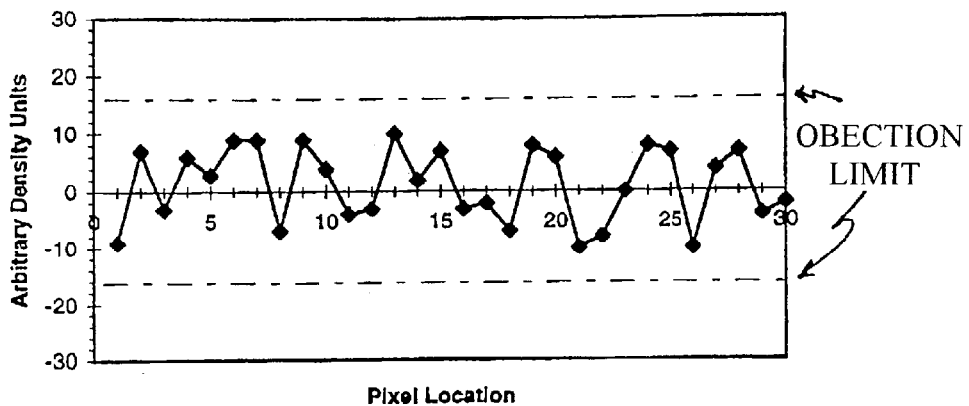
FIGS. 1–3 are graphical views useful in demonstrating noise in images.
Figure 2:
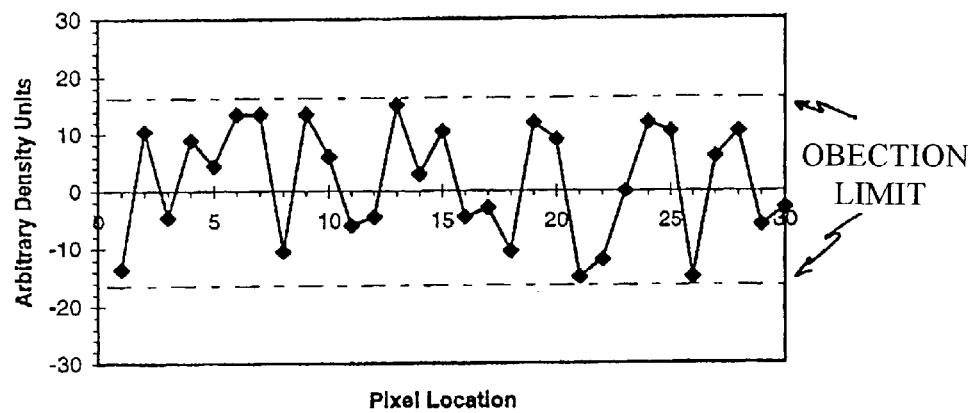
Figure 3:
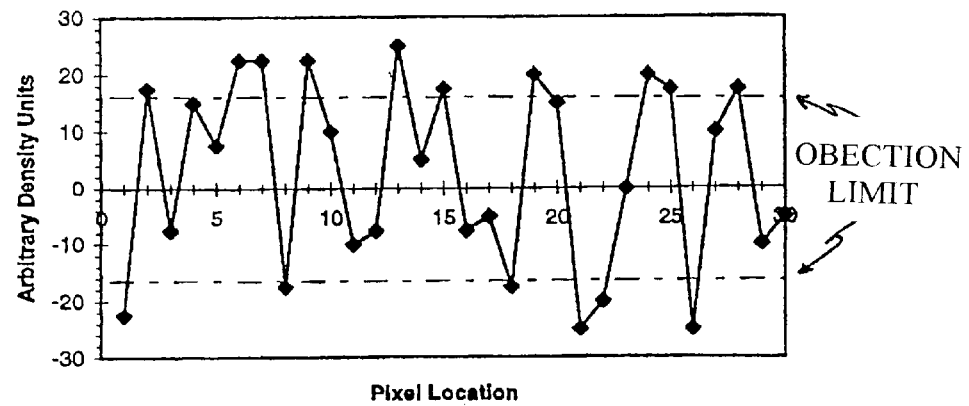
Figure 4:
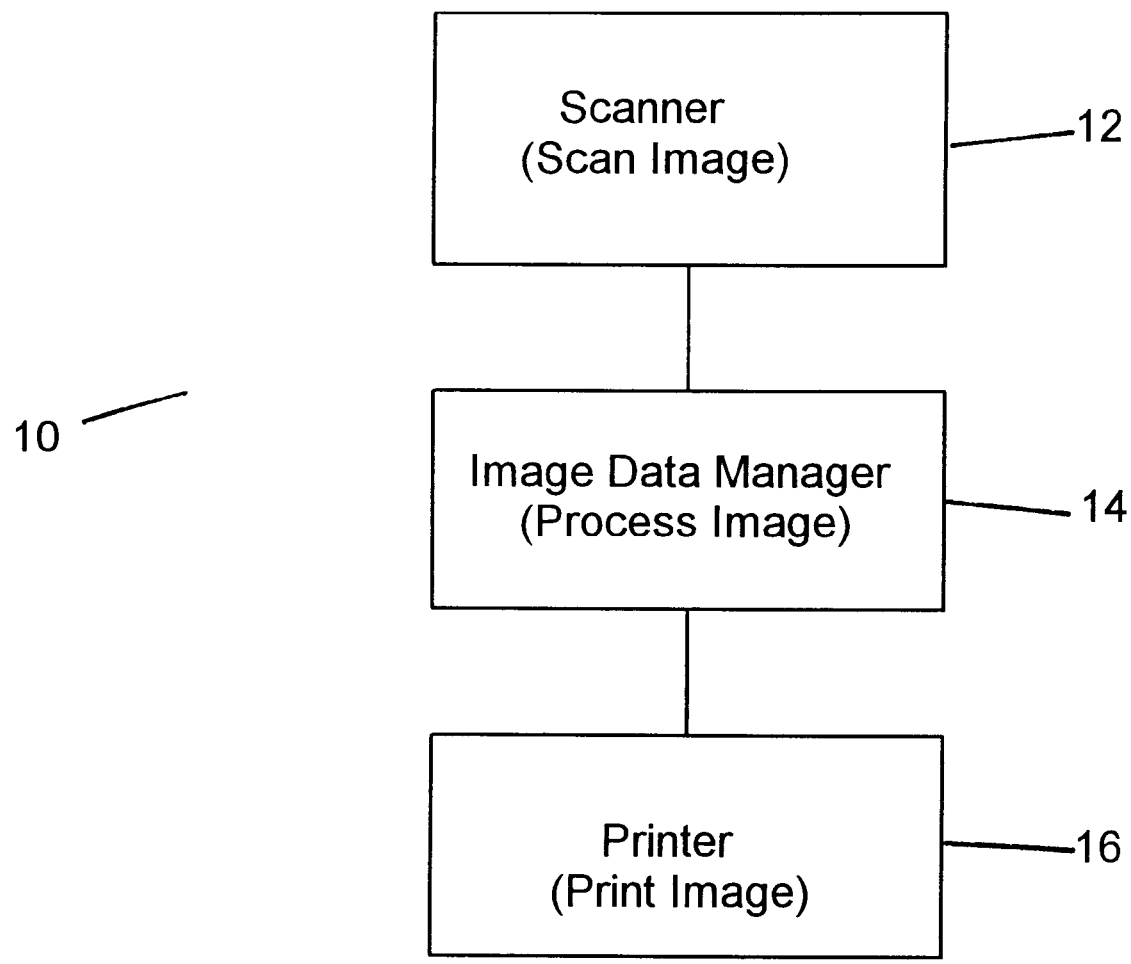
FIG. 4 is a block diagram of a digital photofinishing system incorporating the present invention.

Referring to FIG. 4, there is shown a digital photofinishing system incorporating the present invention. As shown,
system 10 includes a scanner 12, an image data manager 14, and a printer 16. Scanner 12 scans a photographic color negative or color reversal film (slide) to produce a pixellated digital image constituting a m×n matrix of pixels of "m" pixels per row×"n" rows. Image data manager (IDM) 14 (which can be a general purpose digital computer) applies a set of image processing steps to an original digital image to produce a processed image for printing. Printer 16 prints the processed image onto an output medium appropriate for viewing the image. Printer 16 is preferably a high speed laser printer, but can also be a CRT printer, a thermal printer, an ink jet or an electrophotographic printer. The output medium is preferably photographic print paper, but may also be other media specific to alternate devices. The photofinished image can be a color image or a black and white image.

In general, the invention entails measuring the noise in each scanned image with a noise estimation system parameter, adjusting the sharpening to an appropriate level in an image sharpening system and sharpening the original image with the image sharpening system. There is no distinction drawn as to the source of the noise.

Figure 5:
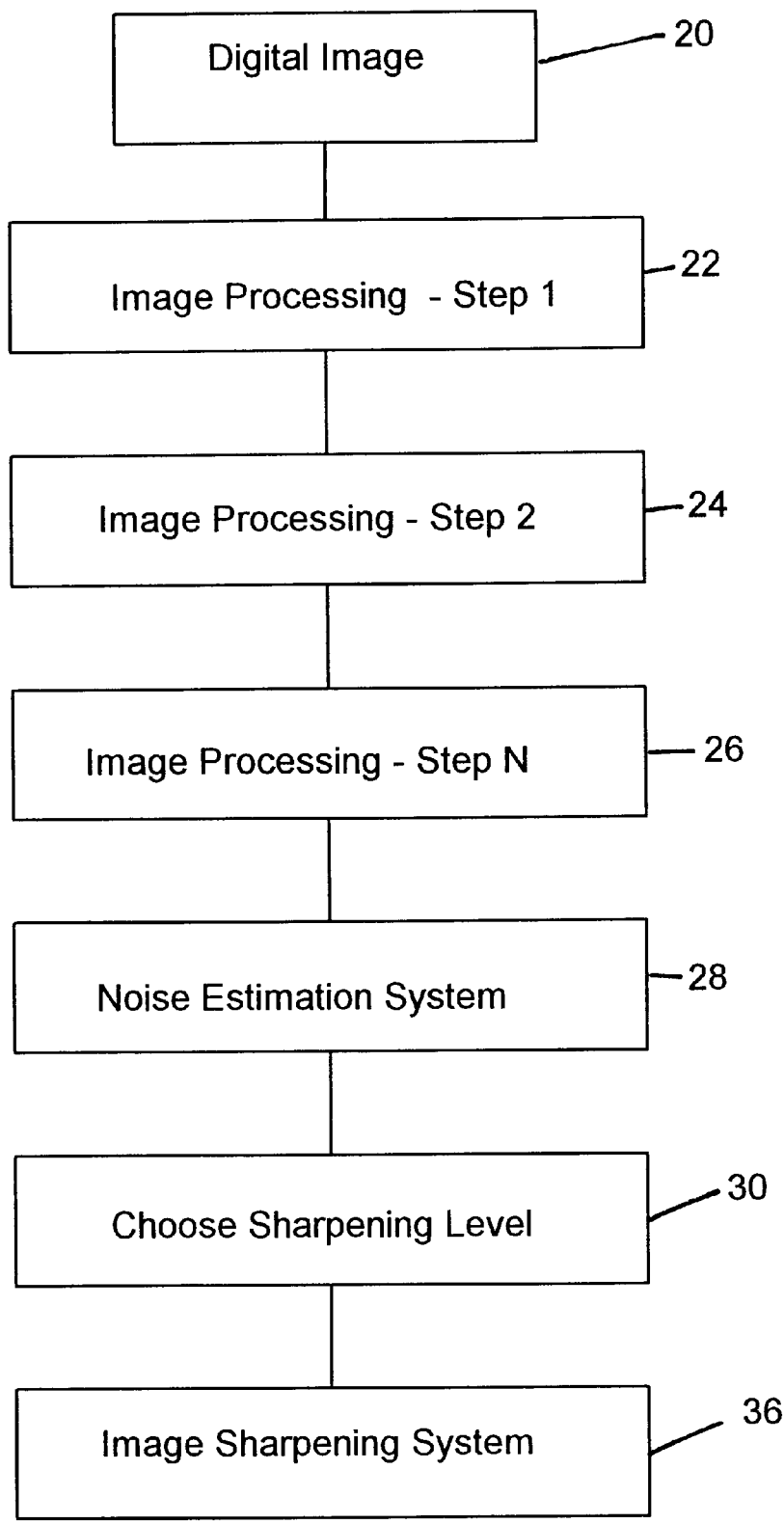
FIG. 5 is a flow diagram of an image processing system incorporating the present invention.

FIG. 5 is a flow diagram of an image processing system carried out in IDM 14. Digital image 20 is sequentially processed by Image Processing Step 1 (box 22), Image Processing Step 2 (box 24), Image Processing Steps not shown, Image Processing Step N (box 26), Noise Estimation System (box 28), Choose Sharpening Level (box 30), and Image Sharpening System (box 32). The Noise Estimation System (box 28) may occur anywhere in the image processing path prior to the Choose Sharpening Level (box 30). However, the preferred location of the Noise Estimation System is immediately prior to Choose Sharpening Level and Image Sharpening System steps after all other image processing has been completed.

The Noise Estimation System (box 28) is an algorithm to calculate an estimate for the noise which is present in the digital image. The result of the algorithm is a standard deviation of the relevant code values in the image. The standard deviation of any one color record, such as green, or a weighted average of more than one color record may be used. The standard deviations at a particular density level, such as that representing an 18% gray card, or a weighted average at several exposure levels may be used.

Figure 6:
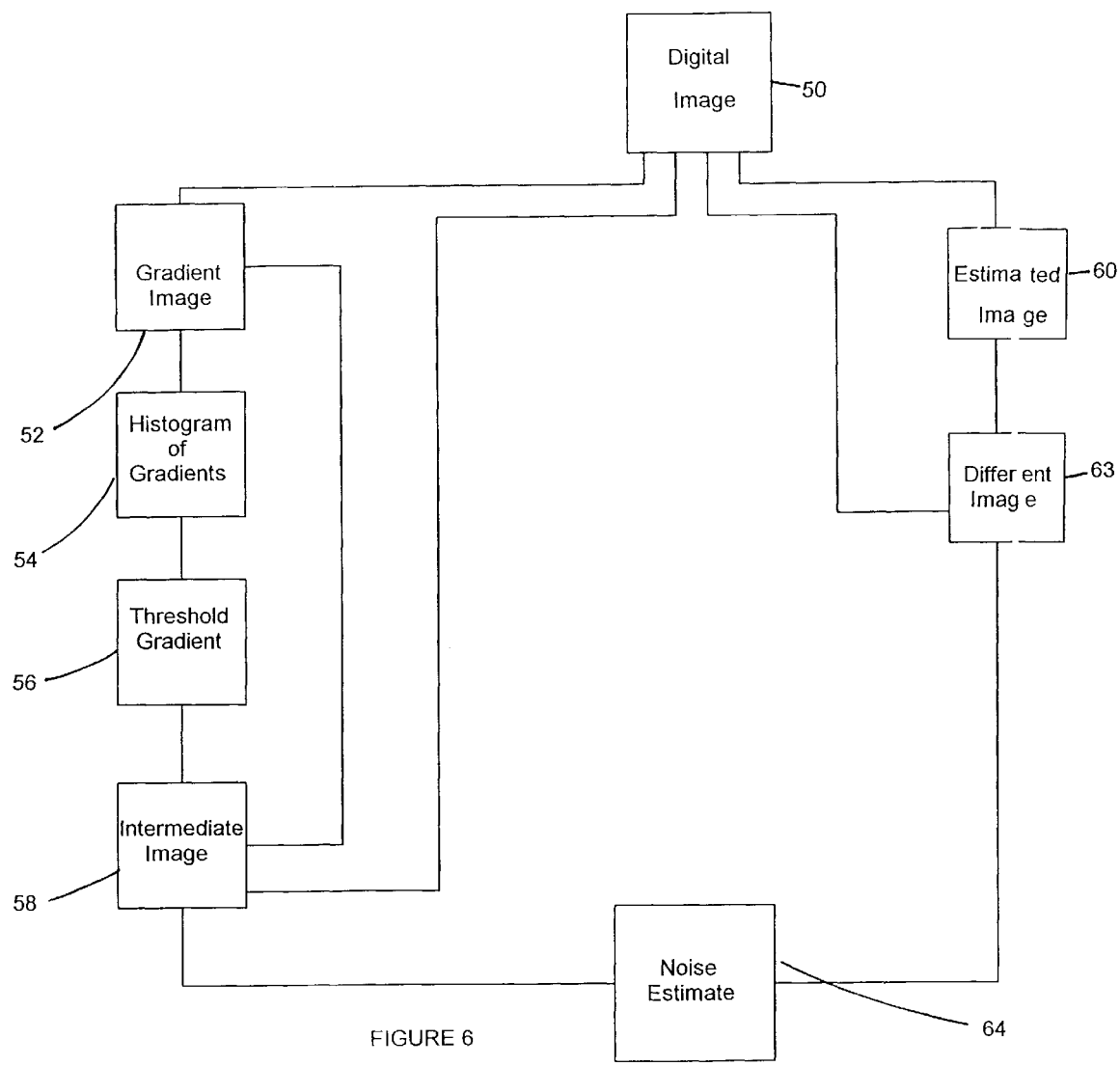
FIG. 6 is a flow diagram of one embodiment of the noise estimation system of the present invention.

The noise estimate is calculated from the digital image by the following steps (FIG. 6):

A gradient image (box 52) is generated from the digital image (box 50). That is, a gradient value is calculated for each pixel in the digital image. Applying a Prewitt operator to the digital image is one embodiment for this step.

A histogram of gradients is generated from the gradient image. (box 54)

A threshold gradient is calculated from the histogram of gradients. Values below the threshold are defined as identifying pixels that represent random noise in the original image. The preferred threshold is two-thirds the maximum gradient value. (box 56)

An intermediate image is derived from the gradient and digital images. For each pixel, if the value from the gradient image is less than the threshold, the value from the digital image is transferred to the intermediate image. (box 58)

An estimated image is calculated from the digital image. The preferred calculation method is to perform, on the digital image, a least squares analysis within a neighborhood of pixels surrounding the pixel of interest. For an odd number of pixels in the neighborhood, the code value for the pixel of interest is simply the average of the code values of all pixels in the neighborhood. (box 60)

A difference image is calculated from the digital image and the estimated image. The preferred method is to subtract the estimated image from the digital image. (box 62)

Noise estimates are generated from the difference image and the intermediate images. The preferred method is to calculate the standard deviation of code values in the difference image for only those pixels which are represented in the intermediate image. (box 64)

In the Choose Sharpening Level (box 30), the noise estimate from the Noise Estimation System (box 28) is used to determine the sharpening level.

The unsharp mask equation is $D_{sharp}=D_{orig}+K^*(D_{orig-Dblurred})$ where $D_{sharp}$ is the sharpened image, $D_{orig}$ is the original image, $D_{blurred}$ is a blurred version of the image, and K is a scalar constant. The noise estimate is used to determine the value, K. The relationship between the noise estimate, and the value, K, is previously derived and digitally stored in the system.

For the following blurring kernel, $$\begin{bmatrix} 0 & 1 & 5 & 1 & 0 \\ 1 & 21 & 38 & 21 & 1 \\ 5 & 38 & 60 & 38 & 5 \\ 1 & 21 & 38 & 21 & 1 \\ 0 & 1 & 5 & 1 & 0 \end{bmatrix} \times \frac{1}{325}$$

empirically, it was found for conditions $$N_{est} < 15, K = 2.5,$$
$$15 \leq N_{est} < 22, K = 2.0,$$
$$22 \leq N_{est} < 30, K = 1.5, \text{ and}$$
$$N_{est} \geq 30, K = 1.0.$$

where $N_{est}$=noise estimate in density units×1000.

In the Image Sharpening System (box 32), the digital image is sharpened to the level which was determined in the Choose Sharpening Level (box 30). One embodiment for the Image Sharpening System (box 32) is to apply the unsharp mask equation to the original image with the value, K, that was chosen from the noise estimate. Note that the entire image is globally sharpened with one value for K. Mahmoodi and Nelson (U.S. Pat. No. 4,571,635) describe a method for modifying the value, K, based on the calculated standard deviation of pixel values in the neighborhood immediately surrounding the pixel of interest. However, the method of Mahmoodi, et al, specifically teach to vary the value, K, pixel by pixel. They gave no consideration for global sharpening with one value for K based on a standard deviation calculation.

An alternative and preferred embodiment for the Image Sharpening System (box 32) uses the difference image that was calculated in the Noise Estimation System (box 28). The difference image can be considered the same as the expression, $(D_{orig}-D_{blurred})$, in the unsharp mask equation. This expression is also known as an edge image in the art. The steps are A value, K, is chosen in box 30 based on the noise estimate from box 28.

A scaled difference image is calculated by multiplying the value, K, with the code value for each of the pixels in the difference image.

The final image is calculated by adding the original image to the scaled difference image.

The noise level in final images, scanned from film, are dependent on many variables. The major variables are film speed, exposure level, and sensor A/D conversion to produce the digital image, but there are many others as well. This invention is designed to estimate the noise which is present in an image regardless of the source(s), derive one sharpening level to be applied globally to the entire image, and sharpen the image.

Although the application (digital photofinishing) described above refers to a system for scanning, processing and printing images from color negative and color reversal films, the invention could apply to either color or black and white digital imaging systems. The process of sharpening a digital image can be performed on any combination of the red, green and blue color channels of a digital image. In our examples, sharpening is performed on a single luminance (or neutral) channel, which is created by taking the average of all three (RGB) channels. The noise estimation algorithm could be applied to any combination of the red, green and blue color channels. It could also be applied to a single channel black and white image.

The invention has been described in detail with particular reference to certain preferred embodiments thereof, but it will be understood that variations and modifications can be effected within the spirit and scope of the invention.

| PARTS LIST | |
|---|---|
| 10 | system |
| 12 | scanner |
| 14 | image data manager |
| 16 | printer |
| 20 | digital image |
| 22 | image processing step 1 |
| 24 | image processing step 2 |
| 26 | image processing step N |
| 28 | noise estimation system |
| 30 | choose sharpening level |
| 32 | image sharpening system |
| 50 | digital image |
| 52 | gradient image |
| 54 | histogram of gradients |
| 56 | threshold gradient |
| 58 | intermediate image |
| 60 | estimated image |
| 62 | difference image |
| 64 | noise estimate |

What is claimed is:

1. A method of processing a digital image comprising the steps of:

providing a pixellated digital image having noise components;

measuring the noise components in said digital image with a noise estimation system to generate noise estimates; and sharpening said digital image with an image sharpening system which uses said noise estimates, where in said measuring step uses a noise measuring system including the following steps;

generating a gradient image from said digital image;

generating a histogram of gradients from said gradient image;

calculating a threshold gradient from said histogram of gradients;

deriving an intermediate image from said image and said gradient image;

calculating an estimated image from said digital image;

calculating a difference image from said digital image and said estimated image; and generating noise estimates from said difference image and said intermediate image.

2. The method of claim 1 wherein said providing step includes the step of scanning an image on photographic media to produce said digital image.

3. The method of claim 2 wherein said photographic media includes negative film, reversal film, and reflection prints.

4. The method of claim 1 wherein said digital image is a color image.

5. The method of claim 1 wherein said digital image is a monochrome image.

6. The method of claim 5 wherein said monochrome image is a black and white image.

7. The method of claim 1 wherein said gradient image generating step calculates a gradient value for each pixel in said digital image.

8. The method of claim 1 wherein a Prewitt operator is applied to said original image in said generating step.

9. The method of claim 1 wherein in said threshold gradient calculating step a preferred threshold is two-thirds the maximum gradient value.

10. The method of claim 1 wherein said threshold gradient calculating step includes defining pixels in the digital image having values below said threshold as representing random noise.

11. The method of claim 1 wherein said intermediate image deriving step includes determining for each pixel if the value from the gradient image is less than the threshold, and if it is, transferring the value from the digital image to the intermediate image.

12. The method of claim 1 wherein said estimated image calculating step includes performing on said digital image a least squares analysis within a neighborhood of pixels surrounding the pixel of interest, such that for an odd number of pixels in the neighborhood, the value of the pixel of interest is the average of the code values of all pixels in the neighborhood.

13. The method of claim 1 wherein said difference image calculating step is carried out by subtracting said estimated image from said digital image.

14. The method of claim 1 wherein said noise estimates generating step is carried out by calculating the standard deviation values in the difference image for only those pixels which are represented in said intermediate image.

15. The method of claim 1 wherein noise estimates are used to determine an image sharpening parameter for an unsharp mask system, and said system is used to sharpen said digital image.

16. The method of claim 15 wherein said unsharp mask system is $D_{sharp} - D_{orig} + K*(D_{orig} - D_{blurred})$ where $D_{sharp}$ is the sharpened image, $D_{orig}$ is the original image, $D_{blurred}$ is a blurred version of the original image, and K is a scalar constant, and wherein said noise estimates ($N_{est}$) are used to determine the value K of said unsharp mask system.

* * * * *